(12) United States Patent
Toler

(10) Patent No.: US 10,384,738 B1
(45) Date of Patent: Aug. 20, 2019

(54) PRIMARY SKID PLATE

(71) Applicant: Timothy Charles Toler, Pineville, LA (US)

(72) Inventor: Timothy Charles Toler, Pineville, LA (US)

( * ) Notice: Subject to any disclaimer, the term of this patent is extended or adjusted under 35 U.S.C. 154(b) by 0 days.

(21) Appl. No.: 15/903,706

(22) Filed: Feb. 23, 2018

(51) Int. Cl.
  *B62J 23/00* (2006.01)
  *B62J 13/04* (2006.01)
  *B62J 99/00* (2009.01)

(52) U.S. Cl.
  CPC ............ *B62J 23/00* (2013.01); *B62J 13/04* (2013.01); *B62J 2099/0086* (2013.01)

(58) Field of Classification Search
  CPC ................................ B62R 19/42; B62J 23/00
  USPC .................... 280/304.3; 180/346; 293/105
  See application file for complete search history.

(56) References Cited

U.S. PATENT DOCUMENTS

| | | | | |
|---|---|---|---|---|
| D294,923 S * | 3/1988 | Nagy | ............................ | D12/126 |
| 5,106,136 A * | 4/1992 | Crain | ........................ | B62J 27/00 280/304.3 |
| D348,676 S * | 7/1994 | Fuller | ............................... | D15/5 |
| D364,129 S * | 11/1995 | Davidson | ....................... | D12/126 |
| D400,128 S * | 10/1998 | Golden | .......................... | D12/126 |
| D411,489 S * | 6/1999 | Davidson | ....................... | D12/126 |
| D411,817 S * | 7/1999 | Davidson | ....................... | D12/126 |
| D445,366 S * | 7/2001 | Davidson | ....................... | D12/126 |
| D446,477 S * | 8/2001 | Netz | ............................... | D12/126 |
| 6,637,787 B1 * | 10/2003 | Salvisberg | ................ | B62J 23/00 180/219 |
| D514,124 S * | 1/2006 | Francis | ............................ | D15/5 |
| 6,988,299 B1 * | 1/2006 | Barrette | .................. | A61G 17/08 27/1 |
| 7,055,843 B2 * | 6/2006 | Kan | ........................... | B62J 27/00 280/291 |
| 7,171,939 B1 * | 2/2007 | Tiller | ....................... | F01L 1/026 123/196 R |
| 7,290,781 B2 * | 11/2007 | Wood | ....................... | B62J 23/00 280/304.3 |
| 8,485,234 B2 * | 7/2013 | Pfaff | ......................... | B62J 31/00 141/333 |
| 8,636,295 B2 * | 1/2014 | Roziere | ..................... | B62J 27/00 280/293 |
| 8,979,685 B2 * | 3/2015 | Weagle | ..................... | B62J 23/00 474/144 |
| 9,216,129 B2 * | 12/2015 | Schauf | .................... | A61G 17/08 |
| D753,026 S * | 4/2016 | Schanz | ......................... | D12/126 |
| D776,018 S * | 1/2017 | Kiska | ............................ | D12/126 |
| D799,552 S * | 10/2017 | McGinley | ....................... | D15/5 |
| 9,834,272 B2 * | 12/2017 | Hosoya | .................... | B62J 23/00 |
| 9,976,477 B2 * | 5/2018 | Banks | ...................... | B62J 27/00 |
| 2004/0251657 A1 * | 12/2004 | Kan | ........................... | B62J 27/00 280/304.3 |
| 2005/0146114 A1 * | 7/2005 | Griffin | ..................... | B62J 23/00 280/304.3 |

(Continued)

*Primary Examiner* — Jeffrey J Restifo
(74) *Attorney, Agent, or Firm* — Dunlap Bennett & Ludwig PLLC

(57) ABSTRACT

A motor cycle protective accessory includes a skid plate with an extension arm. The skid plate is attached to a front of the derby cover and primary cover of a motorcycle. The skid plate forms a spacer between the derby cover and any surface on which the motorcycle is laid or dropped, thus taking the impact of any damage from the surface instead of the derby cover.

8 Claims, 4 Drawing Sheets

(56) References Cited

U.S. PATENT DOCUMENTS

| | | | | |
|---|---|---|---|---|
| 2005/0212254 A1* | 9/2005 | Heitner | ................... | B62H 1/10 |
| | | | | 280/298 |
| 2011/0251324 A1* | 10/2011 | Banks | ..................... | C08K 7/14 |
| | | | | 524/406 |

* cited by examiner

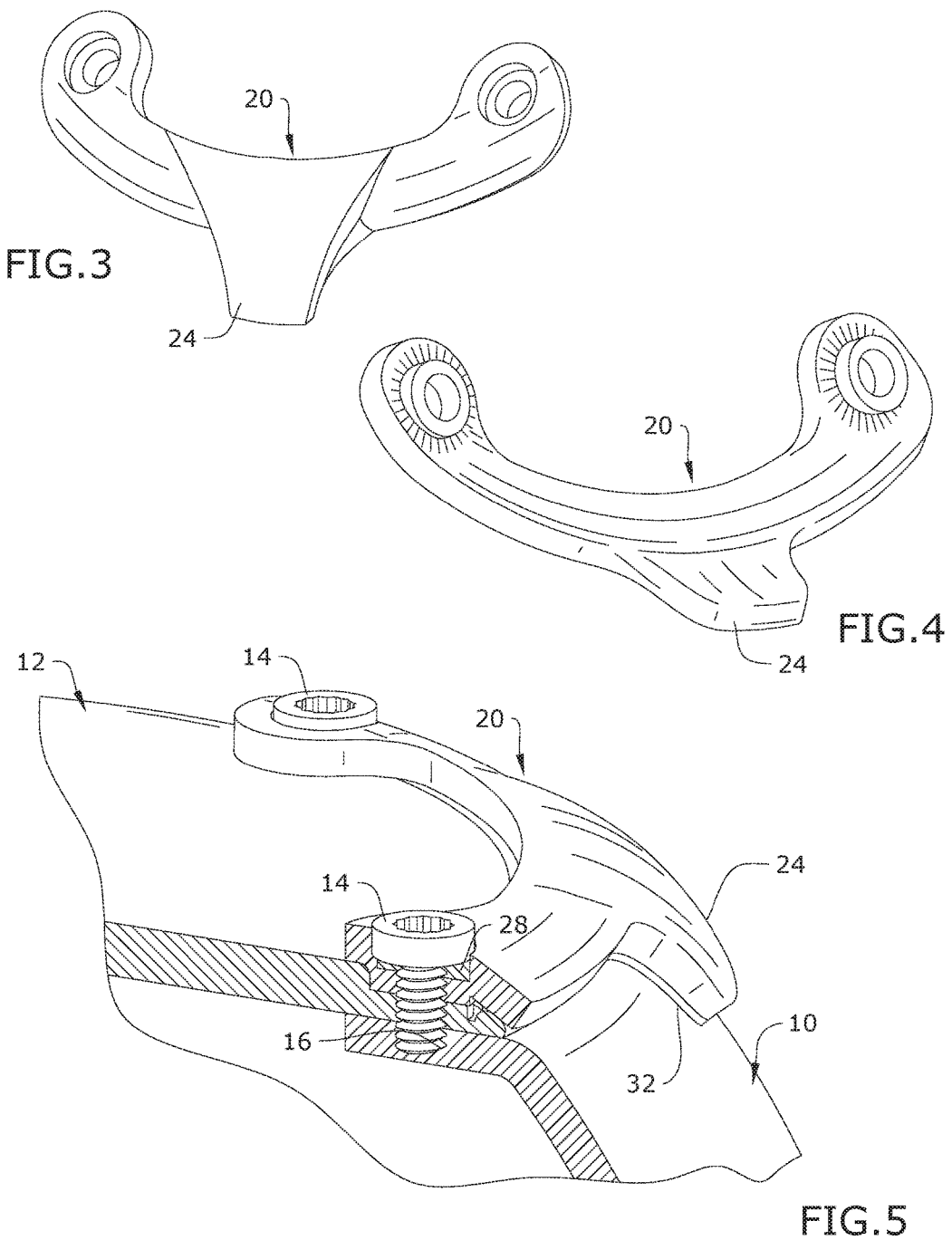

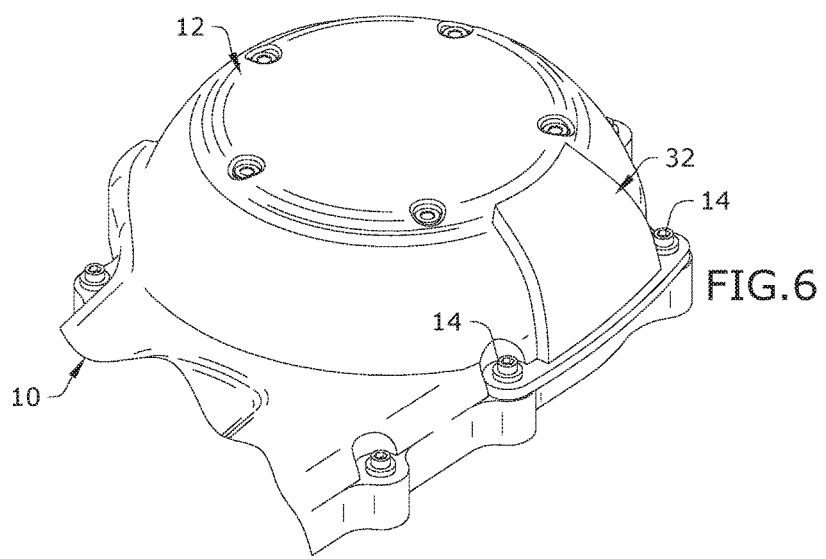
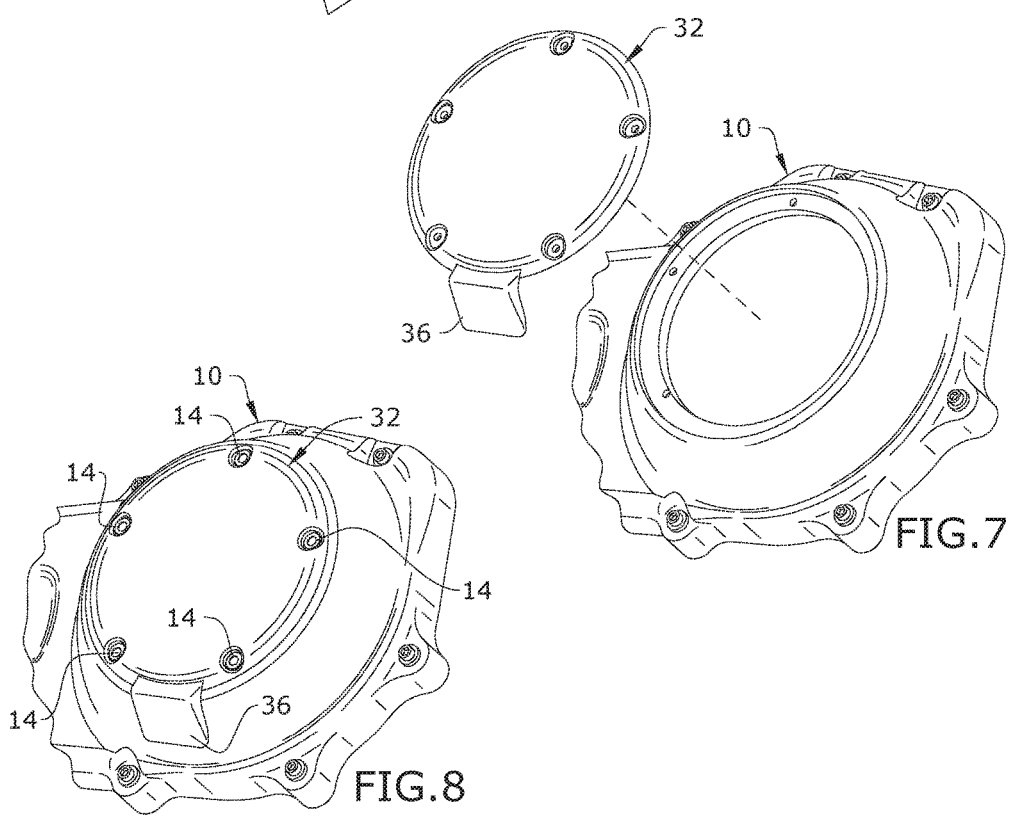

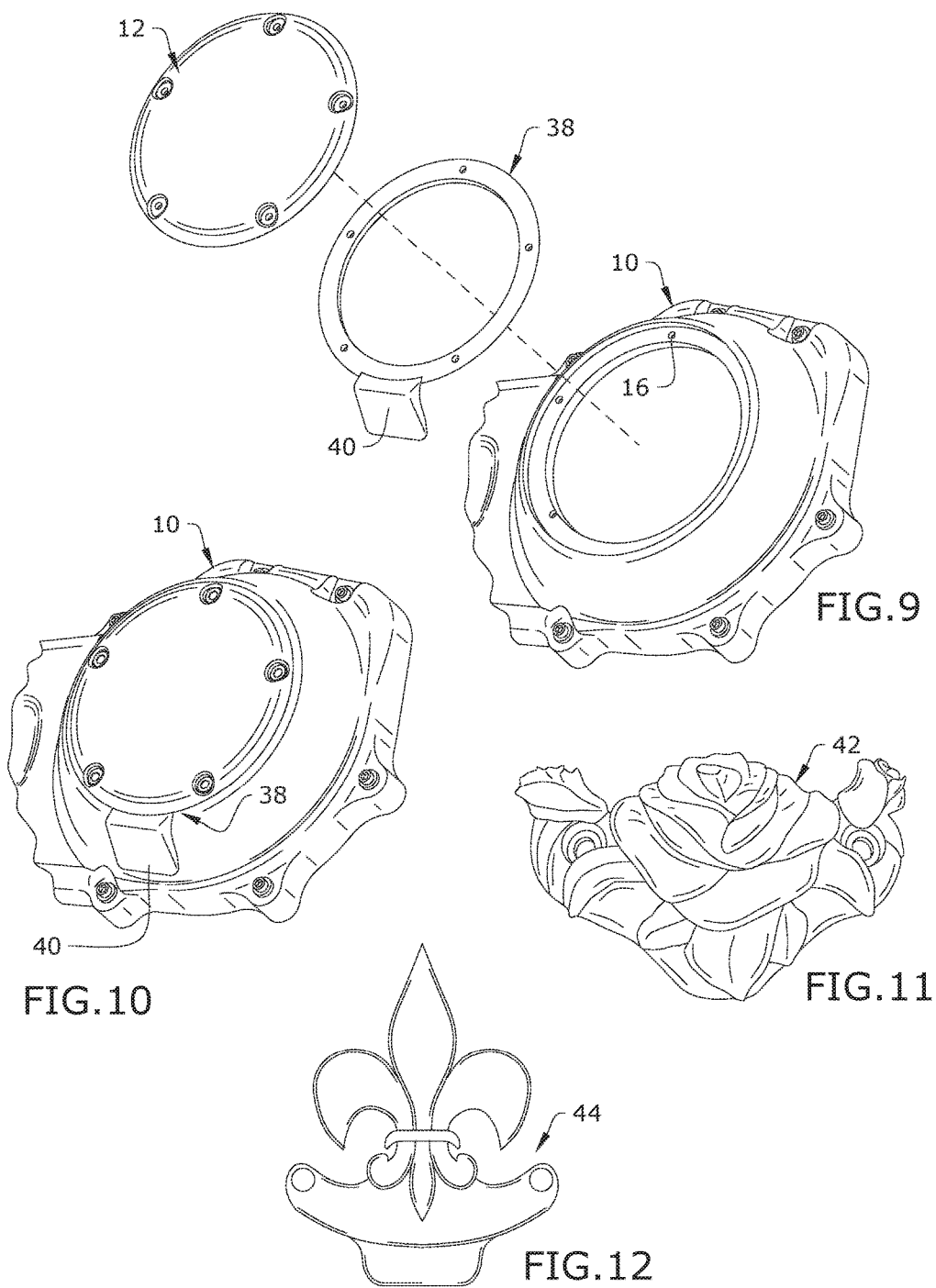

PRIMARY SKID PLATE

BACKGROUND OF THE INVENTION

The present invention relates to protective devices for motorcycles, or more particularly, to a skid plate for a derby cover of a motorcycle.

Motorcyclists spend a great amount to protect parts of their motorcycles ("bike"). For example, customized derby covers and primary covers are very costly and detailed. Often, if a bike is laid down on the primary side, the primary cover and the derby cover of the bike are damaged.

There exists a need for a protective device for the derby cover of a motorcycle to avoid damage when the bike is laid down.

BRIEF DESCRIPTION OF THE DRAWINGS

FIG. 3 is a perspective view of one embodiment of the invention;

FIG. 4 is a rear perspective view of one embodiment of the invention;

FIG. 5 is a sectional view of the invention taken along line 5-5 of FIG. 1;

FIG. 6 is a perspective view of an alternative embodiment of the invention;

FIG. 7 is an exploded view of an alternative embodiment of the invention;

FIG. 8 is a perspective detail view of an alternative embodiment of the invention;

FIG. 9 is an exploded view of an alternative embodiment of the invention;

FIG. 10 is a perspective detailed view of an alternative embodiment of the invention;

FIG. 11 is a front view of an alternative embodiment of the invention; and

FIG. 12 is a front view of an alternative embodiment of the invention.

SUMMARY

In one embodiment, a motorcycle accessory includes an elongated plate comprising a fastener hole on a first end and a second fastener hole on a second end, the elongated plate sized to fit on a derby cover of a motorcycle, and the first fastener hole aligns on a first derby cover fastener hole and the second fastener hole aligns with a second derby cover fastener hole. The motorcycle accessory further comprises an extension arm attached to a front of the elongated plate; the extension arm extending below a lower edge of the elongated plate.

In one embodiment, the derby cover is bolted onto a primary cover of a motorcycle using a plurality of fastener holes on the derby cover and the primary cover.

In one embodiment, the extension arm covers a lower portion of a derby cover and a portion of the primary cover. In an additional embodiment, the motorcycle accessory of claim further includes a rubber gasket substantially the shape of the extension arm and is placed on the back of the extension arm.

In one embodiment, the extension arm is positioned behind the derby cover. In another embodiment, the motorcycle accessory further includes two elongated bolts, the elongated bolts extending into the first and second holes of the elongated plate, the first and second derby cover fastener holes, and a first and second hole of the primary cover.

In one embodiment, the elongated plate is bolted onto a front of the derby cover. In one embodiment, the extension arm forms a spacer between the derby cover and a surface on which a side of the motorcycle with the derby cover is laid. In one embodiment, the elongated plate is made of a metal.

DETAILED DESCRIPTION OF THE INVENTION

A description of preferred embodiments of the invention follows. As previously stated, the derby cover and the primary cover of a bike are often damaged when the bike is laid down on the side with the primary cover.

Broadly, one embodiment of the present invention is a skid plate to be attached to a derby cover of a motorcycle. The skid plate itself will be damaged instead of the primary cover and derby cover, thus taking all the damage instead of the covers.

Figure 1:
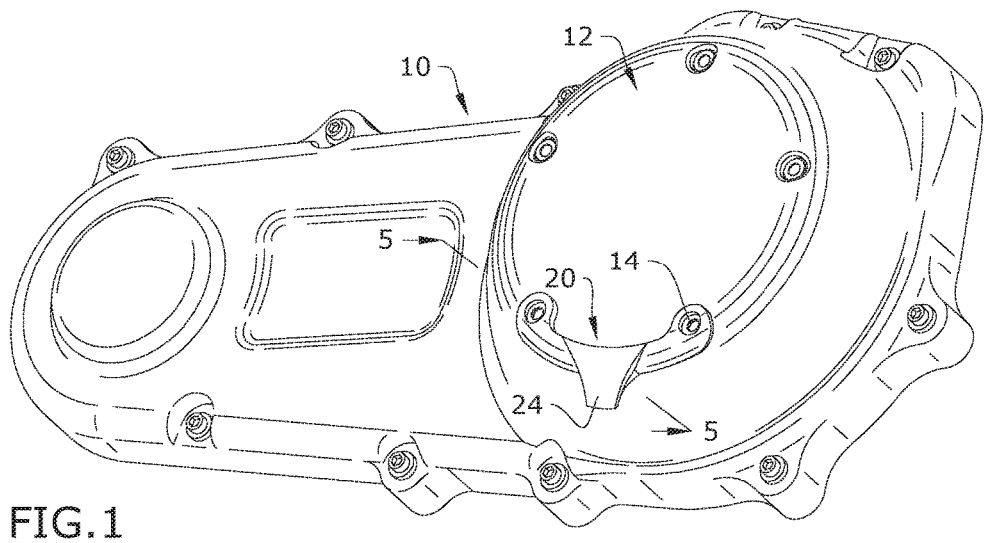
FIG. 1 is a perspective view of one embodiment of the invention.

In the embodiment of FIG. 1, a primary cover 10 is part of a motorcycle. The primary cover 10 includes a primary cover cap plate or derby cover 12. A skid plate 20 is attached to the derby plate with fasteners 14. The fasteners 14 are screws, bolts, or other suitable attachment means. The skid plate 20 also includes extension arm 24 which extends below the skid plate 20.

Figure 2:
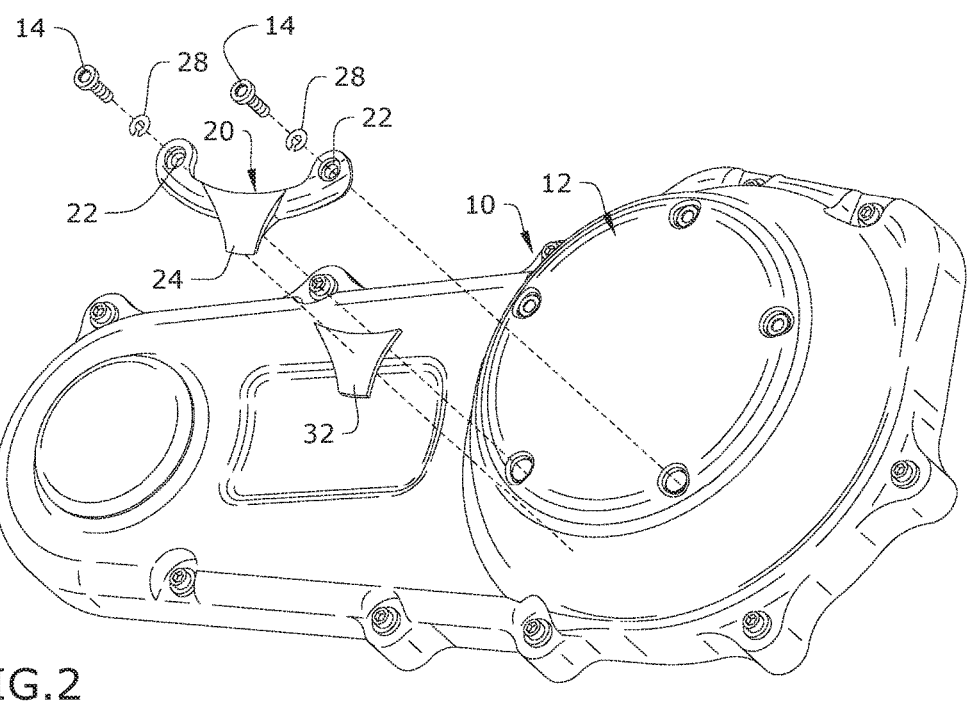
FIG. 2 is an exploded view of one embodiment of the invention.

An exploded view of the assembly is shown in FIG. 2. The derby cover 12 includes openings or bolt holes for the derby cover 12 to be screwed on to the primary cover 10 through primary cover holes 16. The primary cover holes 16 are threaded to accept a male part or bolts 14. The skid plate 20 includes skid plate fastener holes 22, which are used to attach the skid plate 20 to the derby plate 12 and primary cover 10. On one embodiment, the assembly also includes a skid arm gasket 32, which is positioned between the skid plate 20 and the derby cover 12.

As shown in the embodiment of FIG. 3, the skid plate 20 includes the extension arm 24. The skid plate 20 and extension arm 24 are one solid piece, so they are made of the same material. In one embodiment, they are made of a hard metal, such as aluminum or zinc. The extension arm 24 extends from around 1" to 1¼" over lapping the primary cover 10.

A rear view of the skid plate 20 and skid arm 24 is shown in FIG. 4. In one embodiment, the skid plate 20 is bolted to the derby cover 12 and primary cover 10 with two metal bolts 14 and washers 28. A close-up view of this assembly is shown in the sectional view of FIG. 5 (taken along line 5-5 of FIG. 1.) The skid plate gasket 32 is placed between the skid plate 20 and derby cover 12. The gasket 32 is attached to the back side of the skid plate 20 with a glue or adhesive type of material.

The bolts 14 fit within the fastener holes 28 on the skid plate 20 and extend into the holes 18 on the derby cover 12. The bolts 14 are about ¼" longer than the original bolts that were removed, and therefore extend into the holes 16 on the primary cover 10. The washers 28 are then attached, and the assembly of the skid plate 20 to the derby cover 12 and the primary cover 10 is complete. The skid plate 20 will, therefore, protect the derby cover 12 and primary cover 10 from scratches or damage when the bike to which they are attached, is laid down on the side of the primary cover 10.

In one embodiment, the skid plate 20 is made of chrome plated metal, steel, or aluminum. However, it is to be understood that any suitable hard material can be used. The skid gasket 32 is made of rubber, or any similar material. The skid gasket 32 is about 1/8" or 1/16" in thickness, but can be any suitable thickness. The skid gasket 32 prevents the derby cover 12 from getting scratched by the skid plate 20. The washers 28 and bolts 14 are made of stainless steel or any suitable material.

An alternative embodiment of a skid plate is shown in FIG. 6. Here, a gasket 32 replaces the primary skid arm 24 of the prior embodiment. The gasket 32 is curved and fits precisely over a curve of the derby cover 12. The skid plate with gasket 32 is attached as is described in prior embodiments. The gasket 32 is made of a soft rubber or material that is heat resistant.

An alternative embodiment is shown in FIG. 7, wherein a derby cover plate includes an extension arm 36. The derby cover plate and extension arm 36 combination is attached to the primary cover 10 as is a typical derby cover plate. Advantageously, the extension arm 36 does not need additional bolts to attach it to the derby cover 12 since it is a part of the derby cover plate. The combination attached to the primary cover 10 is shown in FIG. 8. The derby cover 12 includes five bolt holes, with no threading so the bolts can go through the derby cover 12 and be attached to the primary cover 10.

An exploded view of an alternative embodiment is shown in FIG. 9. A round skid plate spacer 38 includes a spacer extension 40. The spacer 38 is attached to the primary cover 10 with internal flange holes 16 on the primary cover 10. Additional screws or other suitable fasteners are used to fasten the spacer 38 to the primary cover 10. The derby cover 12 is then bolted on the primary cover 10 as previously described and drops down into the spacer 38. The spacer arm 40 acts as the previously skid plate arm 20 and protects the derby plate 12 and primary cover 10. The skid plate spacer 38 is positioned between the derby cover 12 and the primary cover 10. The extension arm 40 is made on the spacer 38 as one piece. The extension arm 40 overlaps the primary cover 10 by around 1" to 1 1/4" and overlaps the derby cover 12 by around a 1/4" thus protecting the derby cover and primary cover.

An alternative embodiment of a skid plate is shown in FIG. 11. The skid plate is an ornamental design 42. An additional embodiment of an ornamental design 44 is shown in FIG. 12. It should be understood that the skid plate 20 can be any desired ornamental design and serve the same purpose of protecting the derby cover 12 and the primary cover 10 from damage by acting like a shield that takes the impact instead of derby cover 12 and primary cover 10 when the bike is laid down or dropped on its side.

It should be understood, of course, that the foregoing relates to exemplary embodiments of the invention and that modifications may be made without departing from the spirit and scope of the invention as set forth in the following claims.

What is claimed is:

1. A motorcycle accessory comprising:
   an elongated plate comprising a first fastener hole on a first end and a second fastener hole on a second end, the elongated plate sized to fit on a derby cover of a motorcycle, wherein the first fastener hole aligns with a first derby cover fastener hole and the second fastener hole aligns with a second derby cover fastener hole; and
   an extension arm attached to a front of the elongated plate; the extension arm extending below a lower edge of the elongated plate, wherein
   the extension arm is positioned behind the derby cover.

2. The motorcycle accessory of claim 1, wherein the derby cover is bolted onto a primary cover of a motorcycle using a plurality of fastener holes on the derby cover and the primary cover.

3. The motorcycle accessory of claim 1 wherein the wherein the derby cover is bolted onto a primary cover of a motorcycle and the extension arm covers a lower portion of a derby cover and a portion of the primary cover.

4. The motorcycle accessory of claim 1 further comprising a rubber gasket substantially the shape of the extension arm, the rubber gasket being placed on the back of the extension arm.

5. The motorcycle accessory of claim 1, further comprising two elongated bolts, the elongated bolts extending into the first and second holes of the elongated plate, the first and second derby cover fastener holes, and a first and second hole of a primary cover of the motorcycle.

6. The motorcycle accessory of claim 1, wherein the elongated plate is bolted onto a front of the derby cover.

7. The motorcycle accessory of claim 1, wherein the extension arm forms a spacer between the derby cover and a surface on which a side of the motorcycle with the derby cover is laid.

8. The motorcycle accessory of claim 1, wherein the elongated plate is made of a metal.

\* \* \* \* \*